(12) United States Patent
Chen et al.

(10) Patent No.: US 11,640,107 B2
(45) Date of Patent: May 2, 2023

(54) WAVELENGTH CONVERSION DEVICE AND PROJECTION DEVICE

(71) Applicant: Coretronic Corporation, Hsin-Chu (TW)

(72) Inventors: I-Hua Chen, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/352,365

(22) Filed: Jun. 21, 2021

(65) Prior Publication Data

US 2022/0011657 A1 Jan. 13, 2022

(30) Foreign Application Priority Data

Jul. 9, 2020 (CN) .......................... 202010655251.9

(51) Int. Cl.
  *G03B 21/20* (2006.01)
(52) U.S. Cl.
  CPC .................................. *G03B 21/204* (2013.01)
(58) Field of Classification Search
  None
  See application file for complete search history.

(56) References Cited

U.S. PATENT DOCUMENTS

| 2015/0116671 | A1* | 4/2015 | Kuroi .................. | G03B 21/204 252/301.4 R |
|---|---|---|---|---|
| 2019/0056586 | A1 | 2/2019 | Zhang | |
| 2020/0044120 | A1 | 2/2020 | Helbing et al. | |
| 2020/0233291 | A1* | 7/2020 | Chen .................. | G03B 21/204 |

FOREIGN PATENT DOCUMENTS

| CN | 103044892 | 4/2013 |
|---|---|---|
| CN | 103756674 | 4/2014 |
| CN | 105319697 | 2/2016 |
| CN | 105467734 | 4/2016 |
| CN | 105518104 | 4/2016 |
| CN | 106292143 | 1/2017 |
| CN | 107121882 | 9/2017 |

(Continued)

OTHER PUBLICATIONS

Hu et al., "Laser Glass and Its Applications", Shanghai Scientific and Technical Publishers, with English abstract, Dec. 30, 2019, pp. 153-168.
"Office Action of China Counterpart Application", dated Jul. 11, 2022, p. 1-p. 11.

*Primary Examiner* — Bao-Luan Q Le
*Assistant Examiner* — Danell L Owens
(74) *Attorney, Agent, or Firm* — JCIPRNET (57) ABSTRACT

The invention provides a wavelength conversion device and a projection device, where the wavelength conversion device includes a substrate, a wavelength conversion layer, and a light-transmitting layer. The wavelength conversion layer is disposed on the substrate and is made of a wavelength conversion material and a bonding material. The wavelength conversion layer has a refractive index of 1.55-1.70. The light-transmitting layer is disposed on the wavelength conversion layer and is made of the bonding material. The wavelength conversion device and the projection device provided by the invention have greater brightness and are less restricted by temperature during operation.

17 Claims, 3 Drawing Sheets

(56) References Cited

FOREIGN PATENT DOCUMENTS

| | | | |
|---|---|---|---|
| CN | 108023004 | 5/2018 | |
| CN | 207320161 | 5/2018 | |
| CN | 108767099 | 11/2018 | |
| CN | 110737167 | 1/2020 | |
| CN | 110764351 | 2/2020 | |
| JP | 2018013670 A * | 1/2018 | ................ F21S 2/00 |
| TW | 200849314 | 12/2008 | |

* cited by examiner

WAVELENGTH CONVERSION DEVICE AND PROJECTION DEVICE

CROSS-REFERENCE TO RELATED APPLICATION

This application claims the priority benefit of China application serial no. 202010655251.9, filed on Jul. 9, 2020. The entirety of the above-mentioned patent application is hereby incorporated by reference herein and made a part of this specification.

BACKGROUND OF THE INVENTION

1. Field of the Invention

The invention relates to an optical device, and in particular, to a wavelength conversion device and a projection device.

2. Description of Related Art

For a wavelength conversion layer (a fluorescent ceramic piece) in the prior art, in order to cause a refractive index of a bonding material in the wavelength conversion layer to be similar to a refractive index (about 1.80-1.90) of a fluorescent material, a material with a refractive index similar to 1.80 is generally used as a bonding material between fluorescent materials. For example, the bonding material in the wavelength conversion layer in the prior art includes aluminum oxide with a refractive index of about 1.77. Based on this, by reducing a refractive index difference between the bonding material and the fluorescent material, scattering of an incident light beam may be reduced to improve extraction efficiency of a light beam. However, the refractive index of the wavelength conversion layer is about 1.80 and has a great difference from air with a refractive index of 1.00. Therefore, when the light beam is incident to the wavelength conversion layer from air, the light beams of a certain proportion are refracted or reflected by the wavelength conversion layer.

In order to resolve the foregoing problem, an anti-reflection layer is usually coated on a surface of the wavelength conversion layer. However, the anti-reflection layer generally has a temperature limit, and cannot be irradiated by a light beam with a temperature greater than 300° C. For example, when a laser beam with high energy is incident to the surface of the wavelength conversion layer, instantaneous high heat is generated and the temperature thereof is greater than 300° C., so that the anti-reflection layer may be damaged and loses the anti-reflection effect thereof.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a wavelength conversion device and a projection device, and the wavelength conversion device and the project device have greater brightness and less restricted by temperature during operation.

Other objectives and advantages of the invention may further be learned from technical features disclosed in the invention.

In order to achieve one or a part or all of the foregoing objectives or other objectives, an embodiment of the invention provides a wavelength conversion device, and the wavelength conversion device includes a substrate, a wavelength conversion layer, and a light-transmitting layer. The wavelength conversion layer is disposed on the substrate and is made of a wavelength conversion material and a bonding material. The wavelength conversion layer has a refractive index of 1.55-1.70. The light-transmitting layer is disposed on the wavelength conversion layer and is made of the bonding material.

In order to achieve one or a part or all of the foregoing objectives or other objectives, an embodiment of the invention provides a projection device, and the projection device includes an excitation light source device, a wavelength conversion device, a light valve, and a projection lens. The excitation light source device is configured to provide an excitation light beam. The wavelength conversion device is disposed on a transmission path of the excitation light beam and includes a substrate, a wavelength conversion layer, and a light-transmitting layer. The wavelength conversion layer is disposed on the substrate and is made of a wavelength conversion material and a bonding material. The wavelength conversion layer has a refractive index of 1.55-1.70, and the excitation light beam incident to the wavelength conversion layer is converted into a converted light beam by the wavelength conversion material. The light-transmitting layer is disposed on the wavelength conversion layer and is made of the bonding material. The light valve is disposed on a transmission path of the excitation light beam or/and the converted light beam and is configured to convert the excitation light beam or/and the converted light beam into an image light beam. The projection lens is disposed on a transmission path of the image light beam and is configured to project the image light beam out of the projection device.

Based on the foregoing, embodiments of the invention have at least one of the following advantages or effects. Compared to the prior art, the wavelength conversion device and the projection device of the invention have a lower refractive index difference between the wavelength conversion layer and the air. When the excitation light beams emitted from the laser light source are incident to the wavelength conversion layer, less light beams are scattered and lost due to reflection, so that the wavelength conversion device of the embodiment has greater brightness. Based on this, for the wavelength conversion device and the projection device of the invention, any anti-reflection layer is not required to be disposed on the wavelength conversion layer, so that the wavelength conversion device and the projection device of the invention are not limited by temperature during operation.

To make the foregoing features and advantages of the present invention clearer and easier to understand, a detailed description is made below by using listed embodiments with reference to the accompanying drawings.

Other objectives, features and advantages of the present invention will be further understood from the further technological features disclosed by the embodiments of the present invention where there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Exemplary embodiments of the invention are described in detail, and examples of the exemplary embodiments are shown in the accompanying drawings. Whenever possible, the same reference numerals are used in the drawings and descriptions to indicate the same or similar parts. The invention may also be embodied in various forms and shall not be limited to the embodiments described herein. Thicknesses of layers and regions in the accompanying drawings are increased for clarity. The same or similar reference numerals indicate the same or similar element, which is not repeated in the following paragraphs. In addition, the directional terms mentioned in the embodiments, for example, "above", "below", "left", "right", "front", and "back", refer to the directions in the accompanying drawings. Therefore, the directional terms are only used for illustration instead of limiting this disclosure.

Figure 1:
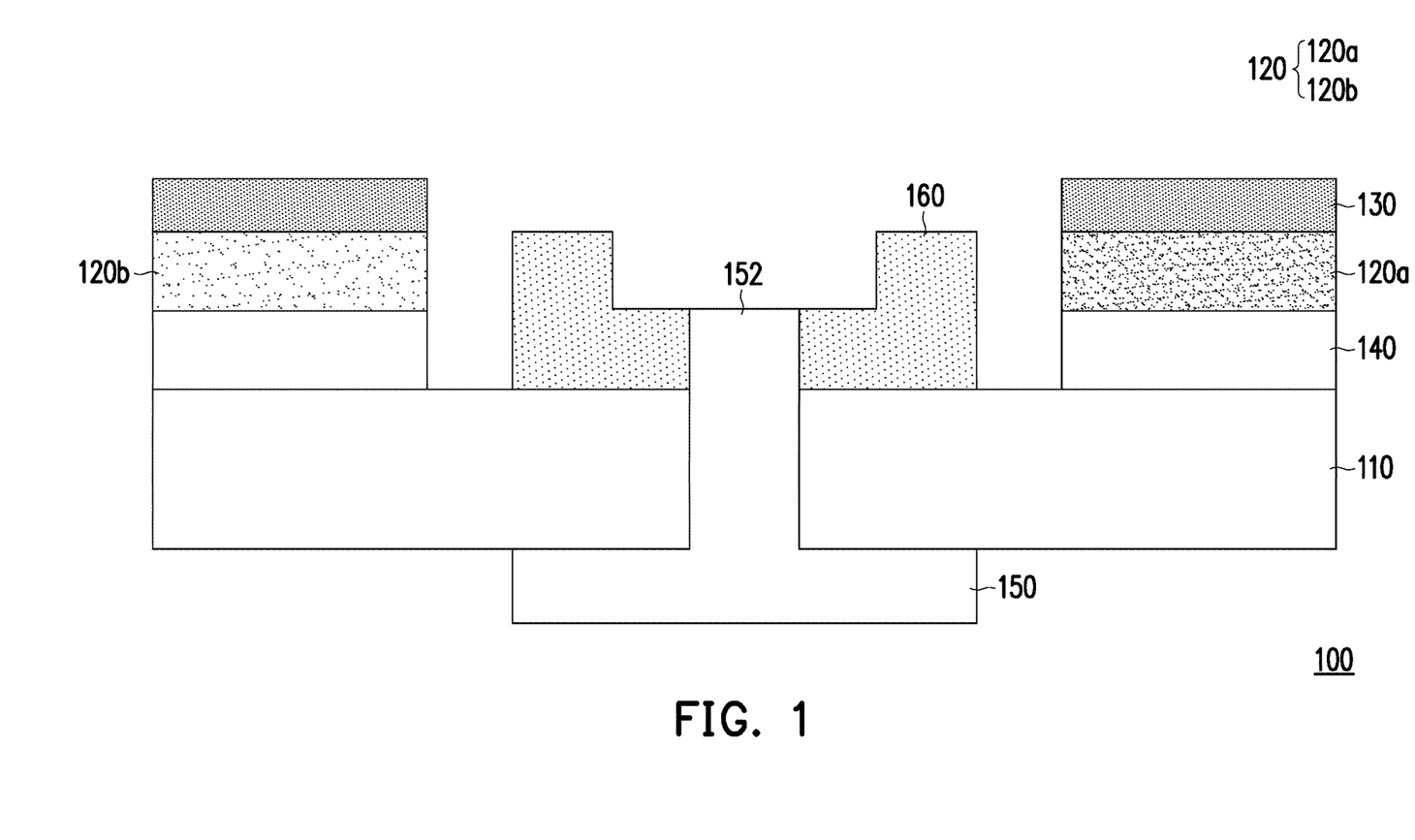
FIG. 1 is a schematic diagram of a wavelength conversion device according to an embodiment of the invention.
Figure 2:
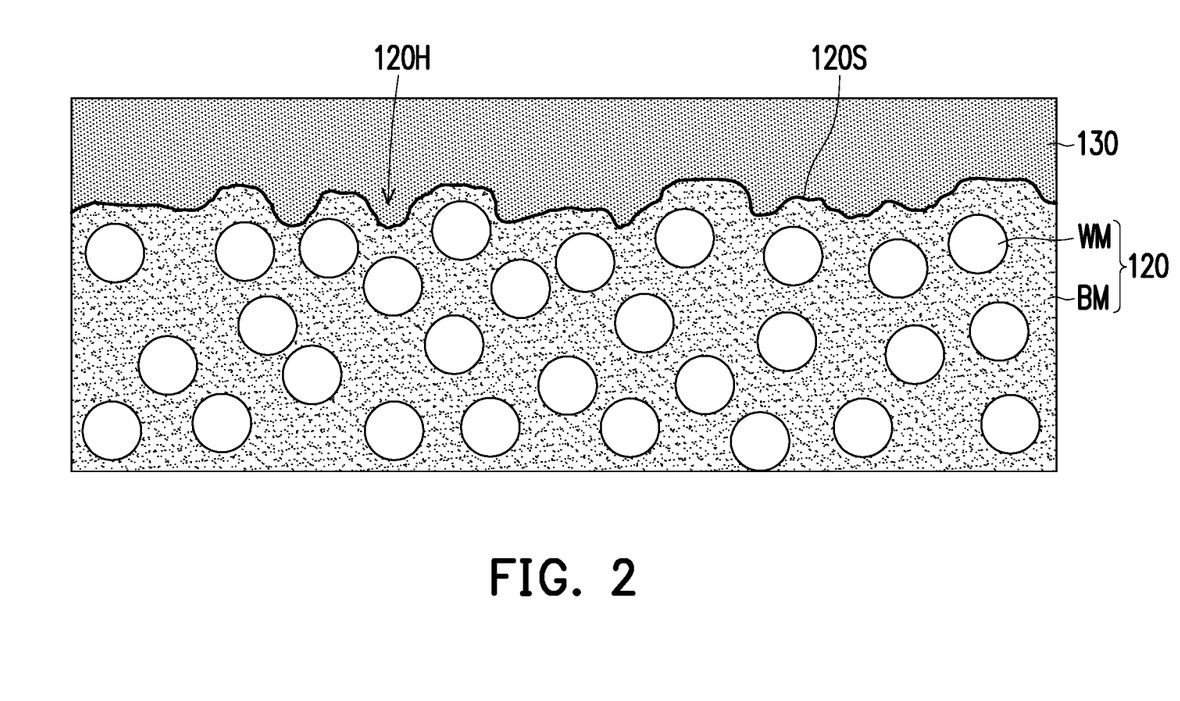
FIG. 2 is a schematic partial cross-sectional diagram of the wavelength conversion device according to an embodiment of the invention.

FIG. 1 is a schematic diagram of a wavelength conversion device according to an embodiment of the invention, and FIG. 2 is a schematic partial cross-section diagram of the wavelength conversion device according to an embodiment of the invention.

Referring to both FIG. 1 and FIG. 2, a wavelength conversion device 100 of the embodiment includes a substrate 110, a wavelength conversion layer 120, a light-transmitting layer 130, a reflective layer 140, a drive element 150, and a fixing ring 160.

A material of the substrate 110 may be, for example, aluminum, aluminum alloy, copper, copper alloy, aluminum nitride, silicon carbide, or a combination thereof, so that the substrate 110 has good thermal conductivity and heat resistance.

The wavelength conversion layer 120 is, for example, disposed on the substrate 110 and is configured to convert a wavelength of an excitation light beam emitted by a laser light source (not shown). In some embodiments, the wavelength conversion layer 120 is made of a wavelength conversion material WM and a bonding material BM. A volume ratio of the wavelength conversion material WM to the bonding material BM is between 1:1 and 17:3. The wavelength conversion material WM is, for example, an inorganic fluorescent material, and for example, has a refractive index of 1.80-1.90, and is not particularly limited in the invention. In the embodiment, the wavelength conversion material WM includes a plurality of fluorescent particles having different sizes, and the plurality of fluorescent particles has particle diameters of 15 μm-30 μm. The bonding material BM may further be, for example, an inorganic material, and has a refractive index of 1.35-1.55. In some embodiments, the bonding material BM may include glass. For example, the bonding material BM may include silicon dioxide, calcium fluoride, magnesium fluoride, or a combination thereof. In addition, the bonding material BM has great transmissivity to visible light, to prevent obstructing the visible light incident to the wavelength conversion layer 120 from exciting the wavelength conversion material WM. In the embodiment, a transmissivity of the bonding material BM to the visible light is greater than or equal to 80%.

In some embodiments, the wavelength conversion layer 120 may include a first wavelength conversion layer 120a and a second wavelength conversion layer 120b. The first wavelength conversion layer 120a and the second wavelength conversion layer 120b may convert a wavelength of an excitation light beam to respectively generate converted light beams with different wavelengths. For example, the first wavelength conversion layer 120a may convert a blue light beam emitted by a laser light source into a green light beam, and the second wavelength conversion layer 120b may convert the blue light beam emitted by the laser light source into a yellow light beam, and the invention is not limited thereto. In other embodiments, only one kind of the wavelength conversion layer 120 may be disposed on the substrate, for example, only a wavelength conversion layer that converts the blue light beam emitted by the excitation light source into the yellow light beam is disposed, and the invention is not limited thereto.

A method for manufacturing the wavelength conversion layer 120 of the embodiment includes the following: for example, a high-temperature sintering process performed on glass (a bonding material BM) mixed with an inorganic fluorescent material (a wavelength conversion material WM), a low-temperature sintering process performed on an alcohol-soluble inorganic adhesive (a bonding material BM) mixed with the inorganic fluorescent material, or a low-temperature sintering process performed on a water-soluble inorganic adhesive (a bonding material BM) mixed with the inorganic fluorescent material (the wavelength conversion material WM), by which the wavelength conversion layer 120 is formed on the substrate 110. In some embodiments, a main component of the alcohol-soluble inorganic adhesive includes a combination of siloxane and metal oxide, and a main component of the water-soluble inorganic adhesive includes at least one of silica-containing silica gel, silicate, or phosphate. A surface 120S of the wavelength conversion layer 120 away from the substrate 110 has, for example, a plurality of pores 120H, and the pores 120H are, for example, generated by the foregoing manufacturing process and a difference in the particle sizes of the fluorescent particles. In addition, the wavelength conversion layer 120 is made of a wavelength conversion material WM with a refractive index of 1.80-1.90 and a bonding material BM with a refractive index of 1.35-1.55. Therefore, the wavelength conversion layer 120 of the embodiment may have an average refractive index of about 1.55-1.70.

The light-transmitting layer 130 is, for example, disposed on the wavelength conversion layer 120, that is, the wavelength conversion layer 120 is located between the light-transmitting layer 130 and the substrate 110. In the embodiment, the light-transmitting layer 130 is made of the bonding material BM and does not include the wavelength conversion material WM. In other words, a material of the light-transmitting layer 130 includes glass and has a refractive index of 1.35-1.55, but it should be noted that the invention is not limited thereto. In some other embodiments, the material of the light-transmitting layer 130 may be other bonding materials having a refractive index of 1.35-1.55. Based on this, in the embodiment, a relative refractive index of the light-transmitting layer 130 to the wavelength conversion layer 120 is 0.80-0.95. Because the light-transmitting layer 130 of the embodiment is made of the bonding material BM, the light-transmitting layer further has relatively great transmissivity to visible light, thereby preventing the light conversion efficiency of the wavelength conversion layer 120 from being lower. In addition, the light-transmitting layer 130 may fill pores 120H on the surface 120S of the wavelength conversion layer 120 away from the substrate 110. Therefore, when a laser light source emits an excitation light beam to the wavelength conversion layer 120, energy is not easily accumulated in the light-transmitting layer 130, so that an optical effect of the wavelength conversion layer 120 may be improved. Furthermore, the light-transmitting layer 130 has good flatness, so that it is conducive to the subsequent formation of a member which would disposed on the surface 120S of the wavelength conversion layer 120 away from the substrate 110. In some embodiments, the light-transmitting layer 130 has a thickness of 5 μm-30 μm.

Based on this, since the wavelength conversion device 100 of the embodiment includes a wavelength conversion layer 120 with a refractive index of 1.55-1.75 and a light-transmitting layer 130 with a refractive index of 1.35-1.55, compared to a situation in which a wavelength conversion device in the prior art includes a wavelength conversion layer with a refractive index of 1.80, the wavelength conversion device 100 of the embodiment may reduce a loss in a light beam caused by a situation in which the excitation light beam is incident to the wavelength conversion layer from the air, and may have greater brightness. In detail, a refractive index difference between the wavelength conversion layer 120 and/or the light-transmitting layer 130 and the air of the embodiment is lower than a refractive index difference in the prior art. When an excitation light beam emitted by the laser light source is incident to the wavelength conversion layer 120 in a direction substantially parallel to the normal (that is, the incident angle and the refraction angle are substantially 0°), according to the Fresnel equation (a reflectance value is a value obtained by dividing the refractive index difference by an added value of the refractive indexes and then squaring), there are less scattered and lost light beams due to reflection than the scattered and lost light beams in the prior art, so that there are more excitation light beams for exciting a wavelength conversion material WM, thereby causing the wavelength conversion device 100 of the embodiment has greater brightness.

The reflective layer 140 is, for example, disposed between the substrate 110 and the wavelength conversion layer 120. In some embodiments, the reflective layer 140 may be a specular reflective layer, and a material of the reflective layer 140 may include silver. In some other embodiments, the reflective layer 140 may be a diffuse reflective layer, and a material of the reflective layer 140 may include diffuse reflective particles such as titanium dioxide, zirconium dioxide, or a combination thereof. The reflective layer 140 may be configured to reflect a light beam passing through the wavelength conversion layer 120 back to the wavelength conversion layer 120, thereby improving the light conversion efficiency of the wavelength conversion layer 120.

The drive element 150 is, for example, connected to the substrate 110 and located on a central axis of the substrate 110 for driving the substrate 110 to rotate with a central axis as a rotation axis. In some embodiments, the drive element 150 is a motor and includes a rotating shaft 152. When the drive element 150 operates, the drive element 150 rotates the substrate 110 through the rotating shaft 152, for example, the first wavelength conversion layer 120a and the second wavelength conversion layer 120b may be sequentially moved to a transmission path of the excitation light beam emitted by the laser light source, so that after the excitation light beam passes through the wavelength conversion device 120, converted light beams having various colors may be generated.

The fixing ring 160 is, for example, connected to the drive element 150. In detail, the fixing ring 160 is connected to the rotating shaft 152 of the drive element 150, so that the substrate 110 may be fixed between the fixing ring 160 and the drive element 150. In some embodiments, a material of the fixing ring 160 is metal, so that the fixing ring has good thermal conductivity and heat resistance.

Based on the foregoing, the wavelength conversion device 100 of the embodiment can provide greater brightness because the wavelength conversion device may prevent the light beam incident to the wavelength conversion layer 120 from being scattered and lost. In this case, for the wavelength conversion device 100 of the embodiment, any anti-reflection layer is not required to be disposed on the wavelength conversion layer 120, so that manufacturing costs may be reduced. In addition, the wavelength conversion device 100 of the embodiment is not limited by temperature during operation.

Illustrative embodiments are listed below to illustrate a situation in which excitation light beams emitted from a laser light source are incident to the wavelength conversion device 100 of the embodiment and the wavelength conversion device in the prior art, but it should be noted that the invention is not limited thereto.

The wavelength conversion device 100 of the embodiment includes a wavelength conversion layer 120 with a refractive index of 1.60 and a light-transmitting layer 130 with a refractive index of 1.40. The light-transmitting layer 130 is made of a bonding material BM (for example, glass) with a thickness of 5 μm-30 μm. Based on this, when the excitation light beams travel from air with a refractive index of 1.00 through the light-transmitting layer 130 to reach the wavelength conversion layer 120, according to the Fresnel equation, about 3.22% of the excitation light beams are reflected, that is, about 3.22% of the excitation light beams are lost.

The wavelength conversion device in the prior art includes a wavelength conversion layer with a refractive index of 1.80. Based on this, when the excitation light beams travel from air with a refractive index of 1.00 to reach the wavelength conversion layer, according to the Fresnel equation, about 8.16% of the excitation light beams are reflected, that is, about 8.16% of the excitation light beams are lost. Based on this, the loss of the excitation light beams is increased by 4.94% for the wavelength conversion device in the prior art.

It may be learnt from the foregoing exemplary embodiment that, compared to the wavelength conversion device in the prior art, when the excitation light beams are incident to the light-transmitting layer and the wavelength conversion layer from the air, the loss of excitation light beams is reduced by 4.94% for the wavelength conversion device of the embodiment. In addition, the converted light beam emitted by the wavelength conversion material excited by the excitation light beam or the excitation light beam that does not excite the wavelength conversion material is scattered and lost again after leaving the wavelength conversion layer, so that the loss of the excitation light beams is reduced by 9.88% for the wavelength conversion device of the embodiment. In other words, the wavelength conversion device 100 of the embodiment may increase the brightness by about 9.88%.

Figure 3:
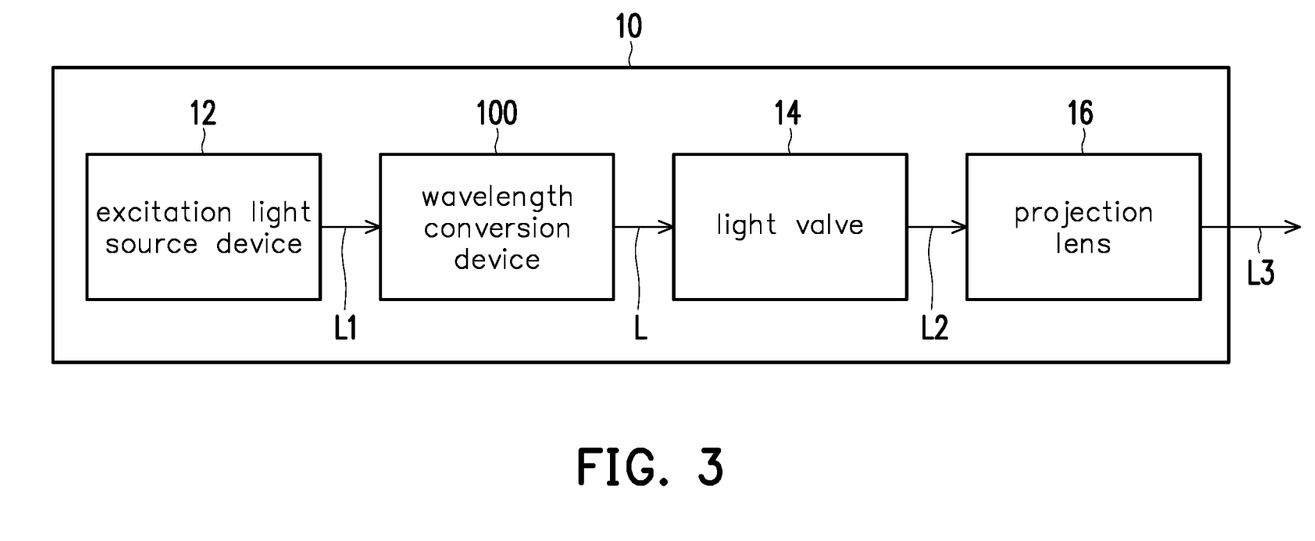
FIG. 3 is a schematic diagram of a projection device according to an embodiment of the invention.

FIG. 3 is a schematic diagram of a projection device according to an embodiment of the invention.

Referring to FIG. 3, a projection device 10 of the embodiment includes an excitation light source device 12, a wavelength conversion device 100, a light valve 14, and a projection lens 16.

The excitation light source device 12 is, for example, configured to emit an excitation light beam L1. In the embodiment, the excitation light source device 12 includes a laser light source, and the excitation light beam L1 emitted from the excitation light source device 12 includes a blue light beam. For example, the excitation light source device 12 may include a laser diode array (not shown) emitting blue light, but the invention is not limited thereto.

The wavelength conversion device 100 is, for example, disposed on a transmission path of the excitation light beam L1, and the wavelength conversion device 100 is configured to convert the excitation light beam L1 into a converted light beam and allow the excitation light beam L1 to pass through. The excitation light beam L1 passing through the wavelength conversion device 100 and the output converted light beam may form an illumination light beam L, and the illumination light beam L is then transmitted to the light valve 14. For example, a drive element 150 included in the wavelength conversion device 100 causes a light passing area (not shown), the first wavelength conversion layer 120a, and the second wavelength conversion layer 120b to enter an irradiation area of the excitation light beam L1 at different time, and the excitation light beam L1 is selectively passed through or converted into a converted light beam. For a relative position and a function of a member included in the wavelength conversion device 100, reference may be made to the foregoing embodiment and is not repeated herein.

In some embodiments, the projection device 10 may further include a light splitting unit (not shown) disposed between the excitation light source device 12 and the wavelength conversion device 14. In other words, the light splitting unit is, for example, disposed on a transmission path of the excitation light beam L1. The light splitting unit includes an element that may separate light beams. For example, the light splitting unit may allow a blue light beam to pass through and provide a reflection effect for light beams of other colors. In the embodiment, the light splitting unit may allow a blue excitation light beam L1 to pass through, so that the excitation light beam L1 may pass through the light splitting unit and be incident to the wavelength conversion device 100.

The light valve 14 is, for example, disposed on a transmission path of an illumination light beam L and configured to convert the illumination light beam L into an image light beam L2. In some embodiments, the light valve 14 is, for example, a reflective optical modulator such as a liquid crystal on silicon panel (LCoS panel) or a digital micromirror device (DMD). In some other embodiments, the light valve 14 is a transmissive optical modulator such as a transparent liquid crystal panel, an electro-optical modulator, a magneto-optical modulator, or an acousto-optic modulator (AOM), and the invention is not limited thereto.

The projection lens 16 is, for example, disposed on a transmission path of the image light beam L2 and is configured to project the image light beam L2 out of the projection device 10. In some embodiments, the projection lens 16 includes, for example, a combination of one or more dioptric optical lenses, for example, includes various combinations of non-planar lenses such as a biconcave lens, a biconvex lens, a concave-convex lens, a convex-concave lens, a plano-convex lens, a plano-concave lens, and the like. In some other embodiments, the projection lens 16 may further include a flat optical lens, and the invention is not limited thereto. Based on this, the projection lens 16 may output, in a reflective or transmissive manner, the image light beam L2 from the light valve 14 to form a projection light beam L3 and project the projection light beam out of the projection device 10.

Based on the foregoing, the embodiments of the invention have at least one of the following advantages or effects. Compared to the prior art, the wavelength conversion device and the projection device of the invention have a lower refractive index difference between the wavelength conversion layer and/or the light-transmitting layer and the air. When the excitation light beams emitted from the laser light source are incident to the wavelength conversion layer, less light beams are lost due to reflection, and therefore there are more excitation light beams used for exciting the wavelength conversion material, so that the wavelength conversion device of the embodiment has greater brightness. Based on this, for the wavelength conversion device and the projection device of the invention, any anti-reflection layer is not required to be disposed on the wavelength conversion layer, thereby reducing manufacturing costs. In addition, the wavelength conversion device and the projection device of the invention are not limited by temperature during operation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion device, comprising a substrate, a wavelength conversion layer, and a light-transmitting layer, wherein
   the wavelength conversion layer is disposed on the substrate, is made of a wavelength conversion material and a bonding material, and has a refractive index of 1.55-1.70, and
   the light-transmitting layer is disposed on the wavelength conversion layer and is made of the bonding material, wherein a relative refractive index of the light-transmitting layer to the wavelength conversion layer is 0.80-0.95.

2. The wavelength conversion device according to claim 1, wherein the bonding material has a refractive index of 1.35-1.55.

3. The wavelength conversion device according to claim 1, wherein a volume ratio of the wavelength conversion material to the bonding material is 1:1 to 17:3.

4. The wavelength conversion device according to claim 1, wherein a transmissivity of the bonding material to a visible light is greater than or equal to 80%.

5. The wavelength conversion device according to claim 1, wherein the wavelength conversion material comprises a fluorescent particle, and the fluorescent particle has a particle size of 15 μm-30 μm.

6. The wavelength conversion device according to claim 1, wherein an anti-reflection layer is not disposed on the wavelength conversion layer or the light-transmitting layer.

7. The wavelength conversion device according to claim 1, wherein a transmissivity of the light-transmitting layer to a visible light is greater than or equal to 80%.

8. The wavelength conversion device according to claim 1, wherein the light-transmitting layer has a thickness of 5 μm-30 μm.

9. The wavelength conversion device according to claim 1, wherein a material of the light-transmitting layer comprises silicon dioxide, calcium fluoride, magnesium fluoride, or a combination thereof.

10. The wavelength conversion device according to claim 1, wherein a material of the substrate comprises aluminum, aluminum alloy, copper, copper alloy, aluminum nitride, silicon carbide, or a combination thereof.

11. The wavelength conversion device according to claim 1, further comprising a reflective layer, wherein the reflective layer is disposed between the substrate and the wavelength conversion layer.

12. A projection device, comprising an excitation light source device, a wavelength conversion device, a light valve, and a projection lens, wherein
    the excitation light source device is configured to provide an excitation light beam;
    the wavelength conversion device is disposed on a transmission path of the excitation light beam, and comprises a substrate, a wavelength conversion layer, and a light-transmitting layer, wherein the wavelength conversion layer is disposed on the substrate, is made of a wavelength conversion material and a bonding material, and has a refractive index of 1.55-1.70, and the excitation light beam incident to
    the wavelength conversion layer is converted into a converted light beam by the wavelength conversion material, and
    the light-transmitting layer is disposed on the wavelength conversion layer and is made of the bonding material;
    the light valve is disposed on a transmission path of the excitation light beam and/or the converted light beam, and is configured to convert the excitation light beam and/or the converted light beam into an image light beam; and
    the projection lens is disposed on a transmission path of the image light beam and is configured to project the image light beam out of the projection device,
    wherein a relative refractive index of the light-transmitting layer to the wavelength conversion layer is 0.80-0.95.

13. The projection device according to claim 12, wherein the bonding material has a refractive index of 1.35-1.55.

14. The projection device according to claim 12, wherein a relative refractive index of the light-transmitting layer to the wavelength conversion layer is 0.80-0.95.

15. The projection device according to claim 12, wherein a volume ratio of the wavelength conversion material to the bonding material is 1:1 to 17:3.

16. The projection device according to claim 12, wherein the light-transmitting layer has a thickness of 5 μm-30 μm.

17. A wavelength conversion device, comprising a substrate, a wavelength conversion layer, and a light-transmitting layer, wherein the wavelength conversion layer is disposed on the substrate, is made of a wavelength conversion material and a bonding material, and has a refractive index of 1.55-1.70, and the light-transmitting layer is disposed on the wavelength conversion layer and is made of the bonding material, wherein a surface of the wavelength conversion layer away from the substrate has a plurality of pores, and the light-transmitting layer fills the plurality of pores.

* * * * *